US012769285B2

(12) United States Patent
Gutierrez

(10) Patent No.: US 12,769,285 B2
(45) Date of Patent: Oct. 20, 2026

(54) SYSTEM AND METHOD FOR AUTOMATED CONFIGURATION OF HANDLING EQUIPMENT AND DOWNHOLE COMPONENTS

(71) Applicant: Weatherford Technology Holdings, LLC, Houston, TX (US)

(72) Inventor: Leonardo Gutierrez, Houston, TX (US)

(73) Assignee: Weatherford Technology Holdings, LLC, Houston, TX (US)

(*) Notice: Subject to any disclaimer, the term of this patent is extended or adjusted under 35 U.S.C. 154(b) by 386 days.

(21) Appl. No.: 18/410,336

(22) Filed: Jan. 11, 2024

(65) Prior Publication Data

US 2025/0208604 A1 Jun. 26, 2025

Related U.S. Application Data

(60) Provisional application No. 63/613,333, filed on Dec. 21, 2023.

(51) Int. Cl.

*G05B 19/4155* (2006.01)
*G06K 19/06* (2006.01)
*G06K 19/07* (2006.01)

(52) U.S. Cl.

CPC ... *G05B 19/4155* (2013.01); *G06K 19/06028* (2013.01); *G06K 19/06037* (2013.01); *G06K 19/0723* (2013.01); *G05B 2219/45208* (2013.01)

(58) Field of Classification Search

CPC ....... G06K 19/06028; G06K 19/06037; G06K 19/0723; G05B 19/4155; G05B 2219/45208

See application file for complete search history.

(56) References Cited

U.S. PATENT DOCUMENTS 7,086,461 B2 8/2006 Schulze-Beckinghausen et al.
7,686,088 B2 3/2010 Shahin
(Continued)

FOREIGN PATENT DOCUMENTS

GB 2545283 A 6/2017
WO 2023017387 A1 2/2023

OTHER PUBLICATIONS

International Search Report and Written Opinion in PCT/US2024/052653 mailed Jan. 2, 2025, 9-pgs.

*Primary Examiner* — Rami R Okasha
(74) *Attorney, Agent, or Firm* — Cabello Hall Zinda, PLLC

(57) ABSTRACT

System and methods disclosed herein store sizing parameters for sized members used with downhole components and stores dimensions of the downhole components to be handled at the wellsite. The sizing parameter for a respective sized member defines how the respective sized member is sized for use with the downhole components. Machine-readable indicia is encoded with the sizing parameters and physically associated with the sized members. When handling a current downhole component, the sizing parameter associated with current sized member is determined by reading the machine-readable indicia The sizing parameter associated with the read indicia is then compared to the stored the dimensions of the downhole components to be handled. An automated response is then produced based on the comparison. The sized members can be gripping elements used in a spider or an elevator, jaws used on a power tong, or features disposed on a downhole tool.

20 Claims, 8 Drawing Sheets

(56) References Cited

U.S. PATENT DOCUMENTS

| | | | |
|---|---|---|---|
| 9,222,318 B2 | 12/2015 | DeBerry et al. | |
| 9,316,099 B2 | 4/2016 | Baxter et al. | |
| 10,392,876 B2 | 8/2019 | Harshbarger et al. | |
| 10,417,608 B2 | 9/2019 | Moore et al. | |
| 10,626,683 B2 | 4/2020 | Hebebrand et al. | |
| 10,641,078 B2 | 5/2020 | Thomas et al. | |
| 10,724,310 B2 | 7/2020 | McIver et al. | |
| 10,801,277 B2 | 10/2020 | Wiedecke et al. | |
| 10,830,008 B2 | 11/2020 | Stankovic et al. | |
| 2005/0077039 A1 | 4/2005 | Shahin et al. | |
| 2007/0124220 A1 | 5/2007 | Griggs et al. | |
| 2009/0205868 A1* | 8/2009 | Lane | E21B 44/00<br>175/24 |
| 2015/0232272 A1 | 8/2015 | Magnuson | |
| 2015/0275592 A1 | 10/2015 | Wood et al. | |
| 2017/0204686 A1 | 7/2017 | Harshbarger et al. | |
| 2019/0309614 A1* | 10/2019 | Benson | E21B 45/00 |
| 2019/0384262 A1* | 12/2019 | Saitou | G05B 19/4068 |
| 2020/0256182 A1 | 8/2020 | Thomas et al. | |

* cited by examiner

SYSTEM AND METHOD FOR AUTOMATED CONFIGURATION OF HANDLING EQUIPMENT AND DOWNHOLE COMPONENTS

CROSS-REFERENCE TO RELATED APPLICATIONS

This application claims the benefit of U.S. Provisional Appl. No. 63/613,333 filed Dec. 21, 2023, which is incorporated herein by reference in its entirety.

BACKGROUND OF THE DISCLOSURE

Wellsite installations use tubular components that have different sizes, weights, grades, and the like. Additionally, various types of surface handling equipment and downhole tools are used during installations and operations at a wellsite. A wellsite plan includes details for the configuration and the dimensional requirements of the tubular components, the downhole tools, the surface handling equipment, and other components to be used at the wellsite. Dressing accessories (jaws, slips, carriers, arms, calipers, etc.) are set in place to accommodate the configuration and the dimensional requirements.

Although the wellsite plan has such details, operators often need to manually input, track, and verify parameters associated with the tubular components, downhole tools, handling equipment, and other components as the operators perform the installations and the operations at a rig. Any errors or mismatch between the details of the wellsite plan and the associated parameters of the components will result in lost time, improper installations, improper operations, and other issues at the wellsite.

The subject matter of the present disclosure is directed to overcoming, or at least reducing the effects of, one or more of the problems set forth above.

SUMMARY OF THE DISCLOSURE

Some implementations disclosed herein relate to a method implemented in a computerized system for tubular components handled by handling equipment at a wellsite. For example, the method may include storing, in one or more databases of the computerized system, respective sizing parameters for gripping elements used by the handling equipment, the respective sizing parameter for each respective one of the gripping elements defining how the respective gripping element is sized to engage one or more tubular dimensions. The method may also include encoding, with the computerized system, machine-readable indicia with the respective sizing parameters for the gripping elements. The method may furthermore include physically associating the machine-readable indicia with the gripping elements. The method may in addition include storing, as stored tubular dimensions in the one or more databases, the one or more tubular dimensions for the tubular components to be handled at the wellsite. The method may moreover include handling a current one of the tubular components at the wellsite with the handling equipment, the handling equipment using a current one of the gripping elements, the current gripping element having a machine-readable indicium of the machine-readable indicia.

Handling the current one of the tubular components can involve performing the steps of: determining the respective sizing parameter associated with the current gripping element by reading, with the computerized system, the machine-readable indicium of the current gripping element; comparing, in a comparison with the computerized system, the respective sizing parameter of the current gripping element to the stored tubular dimension stored for the current tubular component; and producing, with the computerized system, an automated response based on the comparison.

The described implementations may also include one or more of the following features. In the method, storing the respective sizing parameters for the gripping elements may include associating identifiers with the respective sizing parameters; where encoding the machine-readable indicia with the respective sizing parameters for the gripping elements may include encoding the machine-readable indicia with the associated identifiers; and where determining the respective sizing parameter associated with the current gripping element may include decoding the identifier from the machine-readable indicium read from the current gripping element; accessing the respective sizing parameter associated in the one or more databases with the decoded identifier; and using the accessed sizing parameter in the comparison to the tubular dimension stored for the current tubular component being handled at the wellsite.

In the method, storing the respective sizing parameters for the gripping elements may include associating direct sizes with the respective sizing parameters; where encoding the machine-readable indicia with the respective sizing parameters for the gripping elements may include encoding the machine-readable indicia with the associated direct sizes; and where determining the respective sizing parameter associated with the current gripping element may include decoding the direct size from the machine-readable indicium read from the current gripping element; and directly using the decoded size in the comparison to the tubular dimension stored for the current tubular component being handled at the wellsite.

In the method, encoding, with the computerized system, the machine-readable indicia with the respective sizing parameters for the gripping elements may include encoding at least one of scannable codes, quick response (QR) codes, bar codes, two-dimensional matrix codes, and radio frequency identification (RFID) devices with the respective sizing parameters.

In the method, physically associating the machine-readable indicia with the gripping elements may include affixing at least one of scannable codes, quick response (QR) codes, bar codes, two-dimensional matrix codes, and radio frequency identification (RFID) devices on the gripping elements.

In the method, storing, in the one or more databases, the tubular dimensions for the tubular components handled at the wellsite may include storing a plan of the tubular components to be installed in a well at the wellsite. In the method, reading the machine-readable indicium of the current gripping element may include reading the machine-readable indicium with a scanner at the wellsite. For example, the scanner can be selected from the group of an optical reader, a camera, an RFID reader, and an RFID reader/writer.

In the method, comparing the respective sizing parameter of the current gripping element to the stored tubular dimension for the current tubular component may include verifying that the respective sizing parameter of the current gripping element fails to fit the stored tubular dimension for the current tubular component. For example, producing the automated response based on the comparison may include producing a warning in response to the verification. In another example, producing the automated response based on the comparison may include automatically adjusting position of the current gripping elements in the handling equipment to fit the tubular dimension stored for the current tubular component being handled at the wellsite.

Some implementations disclosed herein relate to a method implemented in a computerized system for downhole tools deployed at a wellsite. For example, the method may include storing, in one or more databases of the computerized system, respective sizing parameters for sized members used by the downhole tools, the respective sizing parameter for each respective one of the sized members defining how the respective sized member is sized for use downhole on the downhole tool. The method may also include encoding, with the computerized system, machine-readable indicia with the respective sizing parameters for the sized members. The method may furthermore include physically associating the machine-readable indicia with the sized members. The method may in addition include storing, as a stored configuration in the one or more databases, a configuration of the downhole tools and the sized members to be deployed at the wellsite. The method may moreover include handling a current one of the downhole tools at the wellsite having a current one of the sized members, the current sized member having a machine-readable indicium of the machine-readable indicia.

Handling the current one of the downhole tools can involve performing the steps of: determining the respective sizing parameter associated with the current sized member by reading, with the computerized system, the machine-readable indicium of current sized member; comparing, in a comparison with the computerized system, the respective sizing parameter of the current sized member to the stored configuration of the downhole tools and the sized members to deployed at the wellsite; and producing, with the computerized system, an automated response based on the comparison.

The described implementations may also include one or more of the following features. For example, the sized members used by the downhole tools are selected from the group of arms, calipers, fingers, linkages, springs, pads, gripping elements, slips, jaws, carriers, and dressing accessories.

In the method, comparing the respective sizing parameter of the current sized member to the stored configuration of the downhole tools and the sized members to deployed at the wellsite may include verifying that the respective sizing parameter of the current sized member fails to match the stored configuration. In this instance, producing the automated response based on the comparison may include producing a warning in response to the verification. Alternatively, producing the automated response based on the comparison may include automatically adjusting position of the current sized member on the downhole tool to match the stored configuration.

Some implementations disclosed herein relate to a method implemented in a computerized system for downhole components used at a wellsite. For example, the method may include storing, in one or more databases of the computerized system, respective sizing parameters for sized members associated with the downhole components, the respective sizing parameter for each respective one of the sized members defining how the respective sized member is sized for the downhole components. The method may also include encoding, with the computerized system, machine-readable indicia with the respective sizing parameters for the sized members. The method may furthermore include physically associating the machine-readable indicia with the sized members. The method may in addition include storing, as stored dimensions in the one or more databases, dimensions of the downhole components used at the wellsite. The method may moreover include handling a current one of the downhole components at the wellsite, the current downhole component associated with a current one of the sized members, the current sized member having a machine-readable indicium of the machine-readable indicia.

Handling the current one of the downhole tools can involve performing the steps of: determining the respective sizing parameters associated with the current sized member associated with the current downhole component by reading, with the computerized system, the machine-readable indicium of current sized member; comparing, in a comparison with the computerized system, the respective sizing parameters of the current sized member to the stored dimensions of the downhole components used at the wellsite; and producing, with the computerized system, an automated response based on the comparison.

The described implementations may also include one or more of the following features. In one example, the downhole components can be tubular components and the sized members are gripping elements used with handling equipment, and the respective sizing parameters for each respective one of the gripping elements can define how the respective gripping element is sized to engage one or more tubular dimensions as the dimensions of the downhole components used at the wellsite. In this instance, handling a current one of the tubular components at the wellsite may include performing the steps of: determining the respective sizing parameters associated with the current gripping element by reading, with the computerized system, the machine-readable indicium of the current gripping element; comparing, in a comparison with the computerized system, the respective sizing parameter of the current gripping element to a stored tubular dimension for the stored dimensions of the current tubular component; and producing, with the computerized system, the automated response based on the comparison.

In another example, the downhole components can be downhole tools deployed at the wellsite, and the sized members can be used by the downhole tools. The respective sizing parameter can be for a respective one of the sized members defining how the respective sized member is sized for use downhole on the downhole tool. Handling a current one of the downhole tools at the wellsite may include performing the steps of: determining the respective sizing parameter associated with the current sized member by reading, with the computerized system, the machine-readable indicium of the current sized member; comparing, in a comparison with the computerized system, the respective sizing parameter of the current sized member to a stored configuration for the stored dimensions of the downhole tools and the sized members to deployed at the wellsite; and producing, with the computerized system, the automated response based on the comparison.

Some implementations disclosed herein relate to a computerized system for downhole components used at a wellsite. For example, the computerized system may include a database component storing respective sizing parameters for sized members used with the downhole components, the respective sizing parameter for each respective one of the sized members defining how the respective sized member is sized for use with the downhole components, the database component storing dimensions of the downhole components to be used at the wellsite. The computerized system may also include machine-readable indicia encoding the respective sizing parameters for the sized members, the machine-readable indicia physically associated with the sized members. The computerized system may furthermore include one or more processing units in operable communication with the database component and being configured to: read the machine-readable indicia of current sized members; determine the respective sizing parameters associated with the current sized members used with a current one of downhole components at the wellsite; compare, in a comparison, the respective sizing parameters of the current sized members to the stored dimensions of the downhole components used at the wellsite; and produce an automated response based on the comparison.

Implementations may further include one or more corresponding systems, apparatus, and devices, each configured to perform the actions of the disclosed techniques.

The foregoing summary is not intended to summarize each potential embodiment or every aspect of the present disclosure.

DETAILED DESCRIPTION OF THE DISCLOSURE

Figure 1:
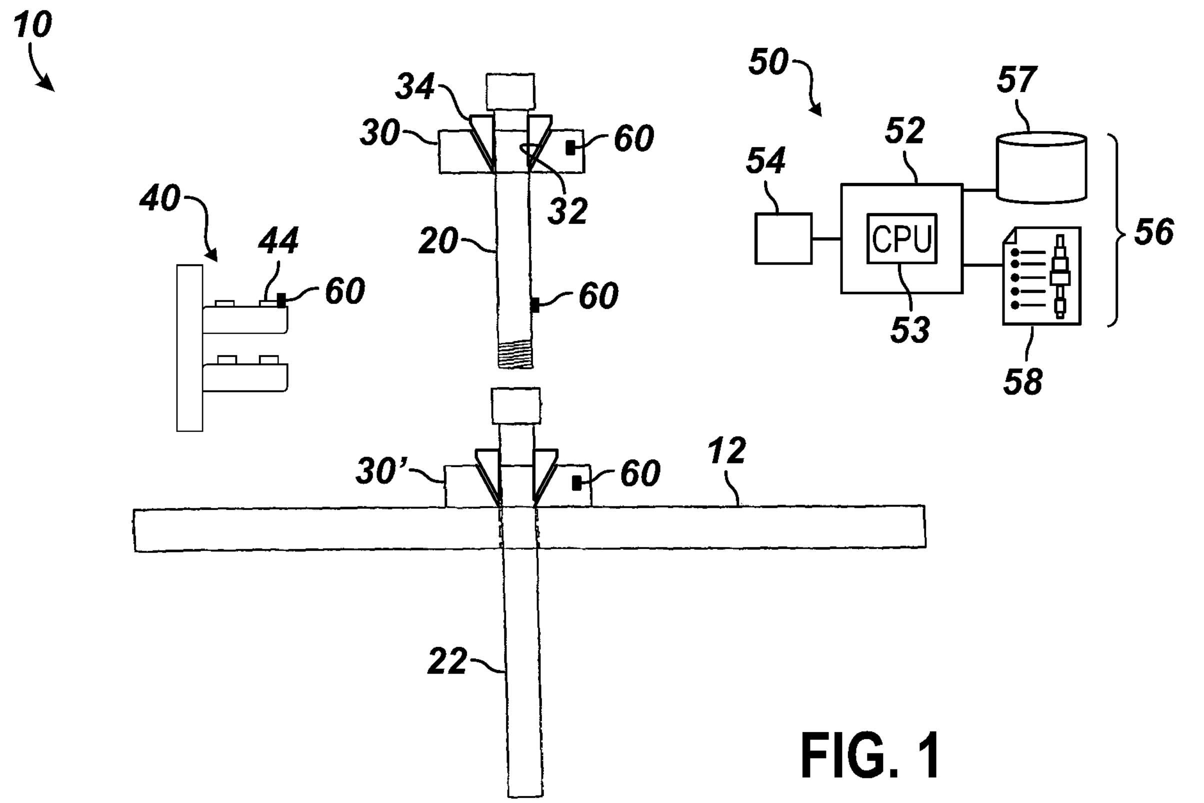
FIG. 1 illustrates tubular handling equipment having a configuration system according to the present disclosure.

FIG. 1 illustrates tubular handling equipment 10 having a configuration system 50 according to the present disclosure. The tubular handling equipment 10 is used at the surface of an oil drilling platform 12. The tubular handling equipment 10 includes equipment, such as a spider 30', an elevator 30, power tongs 40, and the like.

A spider 30' is mounted in the platform 12 and is used for handling and gripping a tubing string 22 (pipe, casing, etc.) extending beneath the platform 12 into a well. When the tubing string 22 is a drill string, the spider 30' may be mounted within a rotary table. An elevator 30 is suspended above the platform 12 and is used to grasp individual lengths of tubular component 20 that are to be attached to the tubing string 22 or that have just been removed from the tubing string 22. The power tong 40 is used to make up connections of the tubular components 20. The spider 30' and the elevator 30 have sized members, such as slips, to engage the tubular components 20. The power tong 40 has sized members in the form of jaws to engage the tubular components 20.

Figure 2:
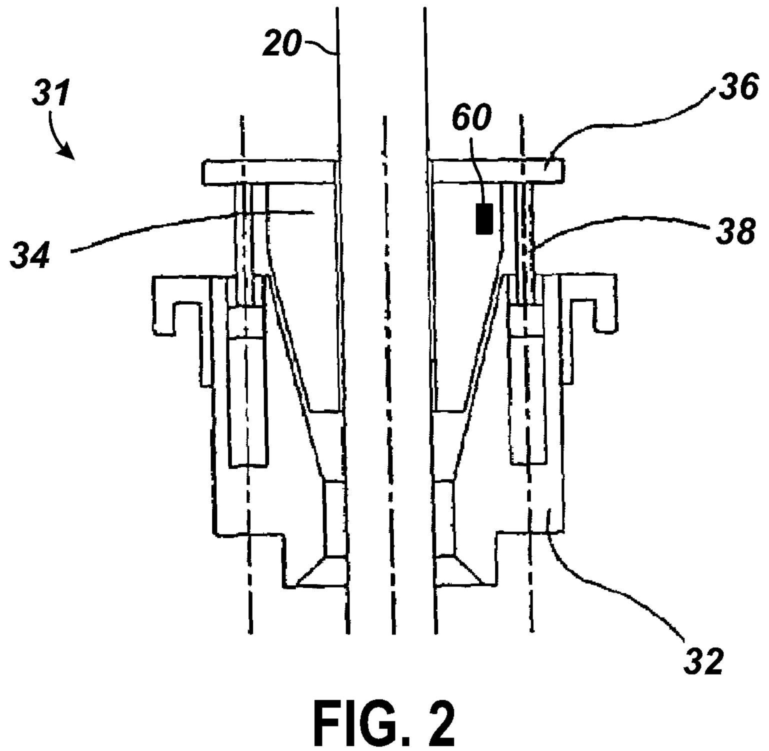
FIG. 2 illustrates a cross-section of tubular handling equipment (e.g., a spider or an elevator) of the disclosed configuration system.

For example, FIG. 2 illustrates a cross-section of tubular handling equipment 31 used with the disclosed configuration system. The spider 30' and the elevator 30 described above can have a construction comparable to the tubular handling equipment 31 shown in FIG. 2. A hollow cylindrical structure or bowl 32 has an inner wall that slopes inwardly towards its lower opening. A support 36 supports a set of slips or gripping elements 34, which are shaped to slide into the upper opening of the bowl 32 and to engage the sloping inner sidewalls of the bowl 32. The gripping elements 34 are free to move radially to a limited extent. Each gripping element 34 can be raised and lowered relative to the bowl 32 by a linear actuator 38 (e.g., a pneumatically or hydraulically driven piston) which engages a cylinder extending into the bowl 32. When the gripping elements 34 are in the lowered position, they will engage the outer surface of a tubular component 20 passing through the center of the tubular handling equipment 31. The weight of the tubular component 20 and the friction between the tubular component 20 and the gripping elements 34 force the gripping elements 34 downward and inward due to a reaction force between the gripping elements 34 and the inner surface of the bowl 32. In this way, the gripping by the gripping elements 34 tightens on the tubular component 20.

Similar to the arrangement in FIG. 2, the spider 30' in FIG. 1 includes a plurality of gripping elements (e.g., slips) 34 circumferentially surrounding the exterior of the tubing string 22. The gripping elements 34 are housed in the bowl 32. The inner sides of the gripping elements 34 usually carry teeth formed on hard metal dies for engaging the tubing string 22. The exterior surface of the gripping elements 34 and the interior surface of the bowl 32 have opposing engaging surfaces which are inclined and downwardly converging. The inclined surfaces allow the gripping elements 34 to move vertically and radially relative to the bowl 32. In effect, the inclined surfaces serve as camming surfaces for engaging the gripping element 34 with the tubular component 20 so the spider 30' is self-tightening. Accordingly, when the weight of the tubing string 22 is transferred to the gripping elements 34, the gripping elements 34 move downwardly with respect to the bowl. As the gripping elements 34 move downward along the inclined surfaces, the inclined surfaces urge the gripping elements 34 to move radially inward to engage the tubular component 20.

The elevator 30 in FIG. 1 also include a self-tightening features of bowl 32, gripping elements 34, and the like similar to the spider 30'. The elevator 30 takes the full weight of the tubing string 22 during the raising or lowering of the tubing string 22 through the spider 30' (and immediately following the addition or removal of a length of tubular from the string).

In the makeup of a tubing string 22, the spider 30' grips the existing tubing string 22. The spider 30' remains stationary while securing the tubing string 22 in the wellbore. A new length of tubular component 20 is removed from a storage rack and is gripped in a vertical orientation by the elevator 30. The elevator 30 positions the tubular component 20 above the tubing string 22 for connection. For example, the elevator 30 is moved to position the lower pin of the new tubular component 20 above the upper box of the tubing string 22 projecting from the spider 30', and the opposed pin and box are engaged. The grip of the elevator 30 is released.

A threaded connection between the tubular component 20 and tubing string 22 can be tightened using a device, such as the power tong 40 or a top drive, which imparts torque to one tubular (pipe, casing, etc.) relative to the other. For example, the new length of tubular component 20 can be engaged by the power tong 40 to tighten the joint. The power tong 40 includes sized members in the form of jaws 44 to engage the tubular component 20.

After completing the connection, the elevator 30 pulls up on the tubing string 22 to release the tubing string 22 from the slips of the spider 30'. For example, the elevator 30 again grips the tubing string 22 and is raised slightly to take the weight of the tubing string 22, and the spider 30' releases the tubing string 22. The tubing string 22 is freed from the spider 30' and is lowered by the elevator 30 through the spider 30' by the height of one length of tubular component 20. Before the tubing string 22 is released from the elevator 30, the spider 30' is allowed to engage the tubing string 22 again to support the tubing string 22. The tubing string 22 is once again gripped by the spider 30'. After the load of the tubing string 22 is switched back to the spider 30', the elevator 30 releases the tubing string 22 and can collect a further length of tubular component 20 to repeat the process.

The configuration system 50 of the present disclosure includes a data acquisition system 52 having a processing unit 53 in operable communication with a memory or a database component, which has one or more databases 56 storing sizing information 57 and wellsite plans 58. A scanner 54 can operate (connect, communicate, etc.) with the data acquisition system 52 to scan machine-readable indicia 60 associated with tubular components 20, downhole tools, and handling equipment (e.g., spider 30', elevator 30, power tongs 40, etc.).

The configuration system 50 and methods according to the present disclosure are directed to how to handle downhole components used at a wellsite and to produce an automated response. The configuration system 50 and methods can be used with equipment of a tubular handling system or can be used with downhole tools to be deployed in a well.

Figure 3:
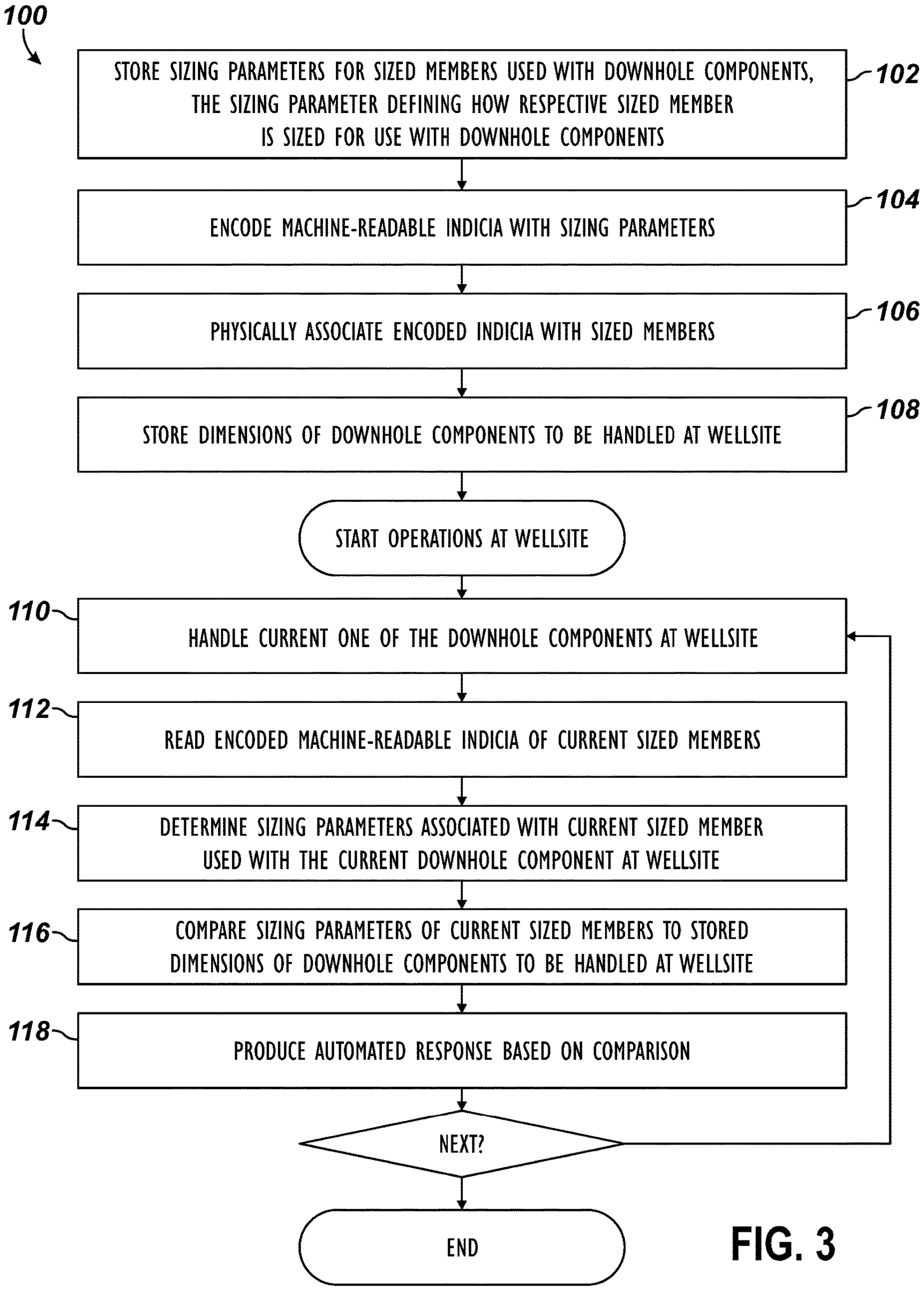
FIG. 3 illustrates a process implemented in a computerized configuration system used with downhole components handled at a wellsite.

Discussion now turns to FIG. 3, which illustrates a process 100 implemented in a computerized configuration system used with downhole components at a wellsite. The downhole component can be a tubular component 20, such as tubing, casing, etc. to be handled, or the downhole component can be a downhole tool to be used downhole.

Either at the wellsite or elsewhere, operators plan and prepare an installation for the wellsite and select and prepare the equipment to be used at the wellsite for a job. Operators configure sizing information 57 in the databases 56 for sized members to be used with downhole components, and operators configure the wellsite plans 58 of the downhole components to be used at the wellsite.

In particular, sizing parameters for a plurality of sized members to be used with the downhole components are stored in the sizing information 57 of the one or more databases 56 of the computerized configuration system 50. The sized members can be gripping elements, slips, jaws, or the like used on handling equipment for the downhole components, or the sized members can be elements used on downhole tools. The sizing parameters for a respective one of the sized members define how the respective sized member is sized for use with the downhole components (Block 102). In general, the sizing information 57 can contain a unique number, such as a serial number, a part number, etc., associated with the sized member. The unique number of the sized member can be associated with specific dimensions, which can be used as an input for determination and calculations in software of the configuration system 50.

Once the sizing parameters are stored, machine-readable indicia 60 are encoded with the sizing parameters for the sized members (Block 104), and the encoded machine-readable indicia 60 are physically associated with the sized members (Block 106). The machine-readable indicia 60 can include scannable codes, quick response (QR) codes, bar codes, two-dimensional matrix codes, or radio frequency identification (RFID) devices. To physically associate the encoded machine-readable indicia 60 with the sized members (e.g., gripping elements, slips, jaws, calipers, etc.), the scannable codes, quick response (QR) codes, bar codes, two-dimensional matrix codes, are radio frequency identification (RFID) devices can be affixed on the sized members.

In the plans and preparations for the installation for the wellsite, dimensions of the downhole components to be handled at the wellsite are also stored in the wellsite plan 58 of the one or more databases 56 (Block 108).

When operations at the wellsite start, operators handle a current one of the downhole components (e.g., tubulars, tools, etc.) at the wellsite (Block 110). For example, operators may be running a tubing string downhole from a rig and may be consecutively selecting and handling the downhole components to be installed on the tubing string and deployed in the well. In another example, operators may be running a tubing string out of hole from a rig and may be consecutively selecting and handling the downhole components being retrieved from the tubing string pulled from the well.

When handling each current downhole component, the sizing parameters associated with current ones of the sized members used with the current downhole component at the wellsite are determined by reading the encoded machine-readable indicia 60 of current sized members (Blocks 112, 114). This can be performed on the rig floor using an appropriate scanner 54 to read the encoded machine-readable indicia 60 of the current sized members. For example, the scanner 54 can be an optical reader, a camera, an RFID reader, or an RFID reader/writer to read the machine-readable indicia 60, and the sizing parameters associated with the machine-readable indicia 60 can be accessed from the indicia 60 itself or obtained from the sizing information 57.

The sizing parameters of the current sized members used with the current downhole component at the wellsite are compared to the stored the dimensions of the downhole components to be handled at the wellsite, as stored in the wellsite plan 58 (Block 116).

When performing the operations, for example, an incorrectly sized member may be currently configured on the handling equipment and may not match the dimensional requirements for the downhole component being handled. Accordingly, an automated response is then produced based on the comparison (Block 118). This automated response can be a warning message given to operators. The warning message can indicate that an incorrectly sized member is currently configured on the handling equipment and does not match the dimensional requirements for the downhole component being handled.

Additionally or alternatively, the automated response can be an automated operation. For example, the handling equipment on the rig can change or adjust the position, orientation, spatial dimension, or the like of the current sized member so that it correctly matches the dimensional requirements for the downhole component being handled.

Figure 4:
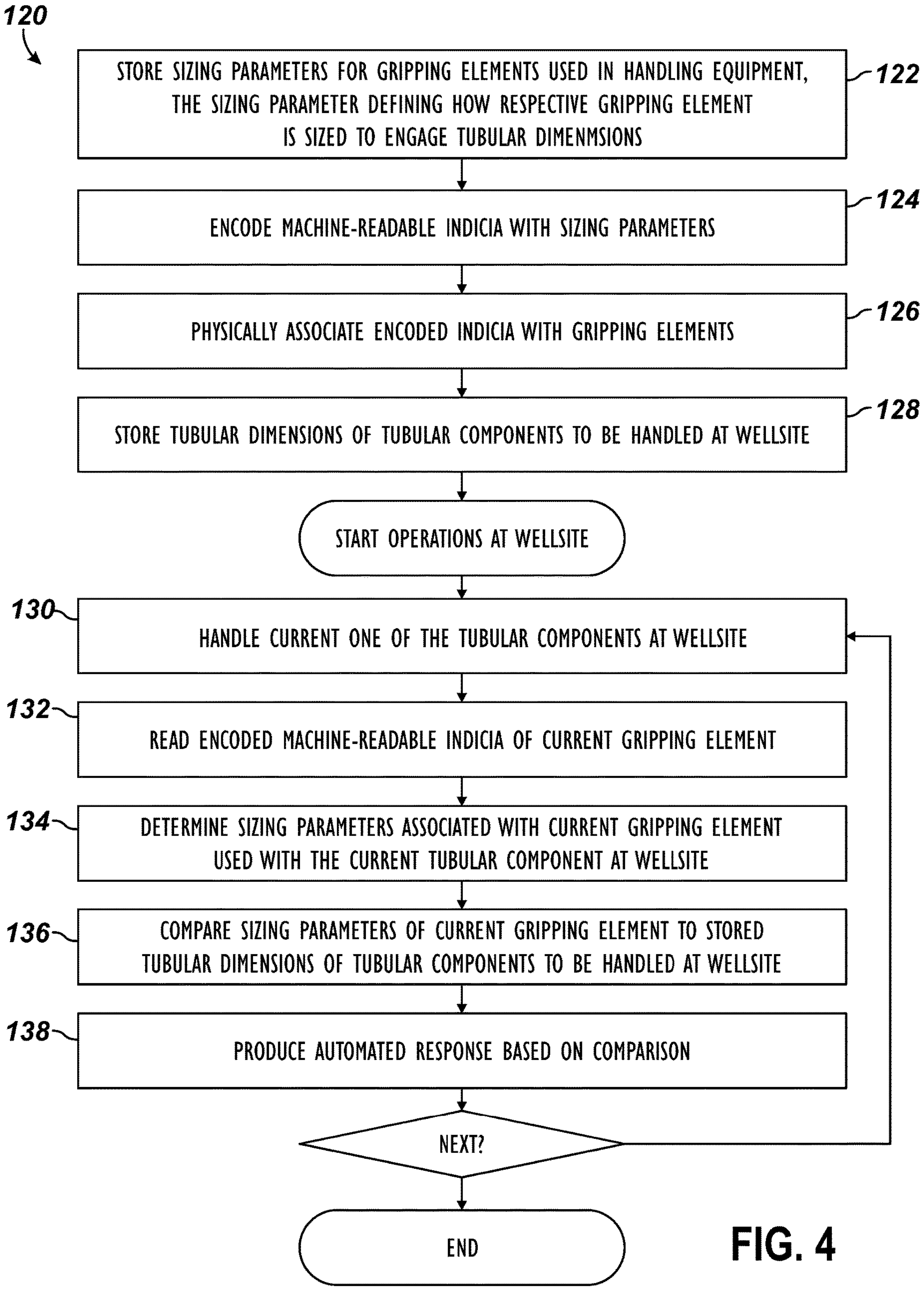
FIG. 4 illustrates one configuration of the process for handing tubular components handled at a wellsite.

As noted above, the configuration system and methods can be used for tubular components handled at a wellsite using equipment of a tubular handling system. For example, FIG. 4 illustrates one configuration of a process 120 implemented in a computerized configuration system 50 for handling tubular components at a wellsite.

Either at the wellsite or elsewhere, operators plan and prepare an installation for the wellsite and select and prepare the equipment to be used at the wellsite for a job. Operators configure sizing information 57 in the databases 56 for sized members (e.g., gripping elements 34, jaws 44, etc.) to be used with tubular components 20, and operators configure the wellsite plans 58 of the downhole components to be used at the wellsite.

In particular, sizing parameters for a plurality of gripping elements 34, 44 used in handling equipment 30, 30', 40 are stored in one or more databases 56 of the computerized configuration system 50. The sizing parameter for a respective one of the gripping elements 34, 44 defines how the respective gripping element 34, 44 is sized to engage one or more tubular dimensions (Block 122). As noted, the gripping elements 34, 44 can include slips, jaws, and the like.

Once the sizing parameters are stored, machine-readable indicia 60 are encoded with the sizing parameters for the gripping elements 34, 44 (Block 124), and the encoded machine-readable indicia 60 are physically associated with the gripping elements 34, 44 (Block 126).

In the plans and preparations for the installation for the wellsite stored in the wellsite plan 58, the tubular dimensions for the tubular components 20 handled at the wellsite are stored in the one or more databases 56 (Block 128). For example, different sized tubulars, pipes, casings, and the like may be planned for the installation to be deployed in the well. Also, assorted sizes of downhole tools, mandrels, and other equipment may be planned for the installation to be deployed in the well.

When operations at the wellsite start, operators handle a current one of the tubular components 20 at the wellsite (Block 130). For example, operators may be running a tubing string 22 downhole from a rig and may be consecutively selecting and handling the tubular components 20 to be installed on the tubing string 22 and deployed in the well. In another example, operators may be running a tubing string 22 out of hole from a rig and may be consecutively selecting and handling the tubular components 20 being retrieved from the tubing string 22 pulled from the well.

When handling each current tubular component 20, the sizing parameters associated with current ones of the gripping elements 34, 44 installed in the handling equipment 30, 30', 40 at the wellsite are determined by reading the encoded machine-readable indicia 60 of current gripping elements 34, 44 (Block 132, 134). This can be performed on the rig floor using an appropriate scanner 54. The sizing parameters of the currently installed gripping elements 34, 44 are compared to the stored tubular dimension for the current tubular component 20 being handled at the wellsite, which is stored in the wellsite plan 58 (Block 136).

In one arrangement, the sizing parameters for the gripping elements 34, 44 can be associated with identifiers so the machine-readable indicia 60 can be encoded with the associated identifiers. When reading and determining the sizing parameters, the identifiers can be decoded from the encoded machine-readable indicia 60 read by the scanner 54 from the current gripping elements 34, 44. The sizing parameters associated in the one or more databases 56 with the decoded identifier can be accessed and used in the comparison to the stored tubular dimension.

In an alternative arrangement, the sizing parameters for the gripping elements 34, 44 can be associated with direct sizes so the machine-readable indicia 60 can be encoded with the direct sizes. When reading and determining the sizing parameters, the direct size can be decoded from the encoded machine-readable indicia 60 read by the scanner 54 from the current gripping elements 34, 44 and can be directly used in the comparison to the stored tubular dimension.

When performing the operations, for example, an incorrectly sized member may be currently configured on the rig and may not match the dimensional requirements for the tubular component 20 being handled. Accordingly, an automated response is then produced based on the comparison (Block 138). This automated response can be a warning message given to operators. The warning message can indicate that an incorrectly sized gripping element 34, 44 is currently configured on the rig and does not match the dimensional requirements for the tubular component 20 being handled.

Additionally or alternatively, the automated response can be an automated operation. For example, the handling equipment 30, 30', 40 can change or adjust the position, orientation, spatial dimension, or the like of the current gripping element 34, 44 so that it correctly matches the dimensional requirements for the tubular component 20 being handled.

Figure 5:
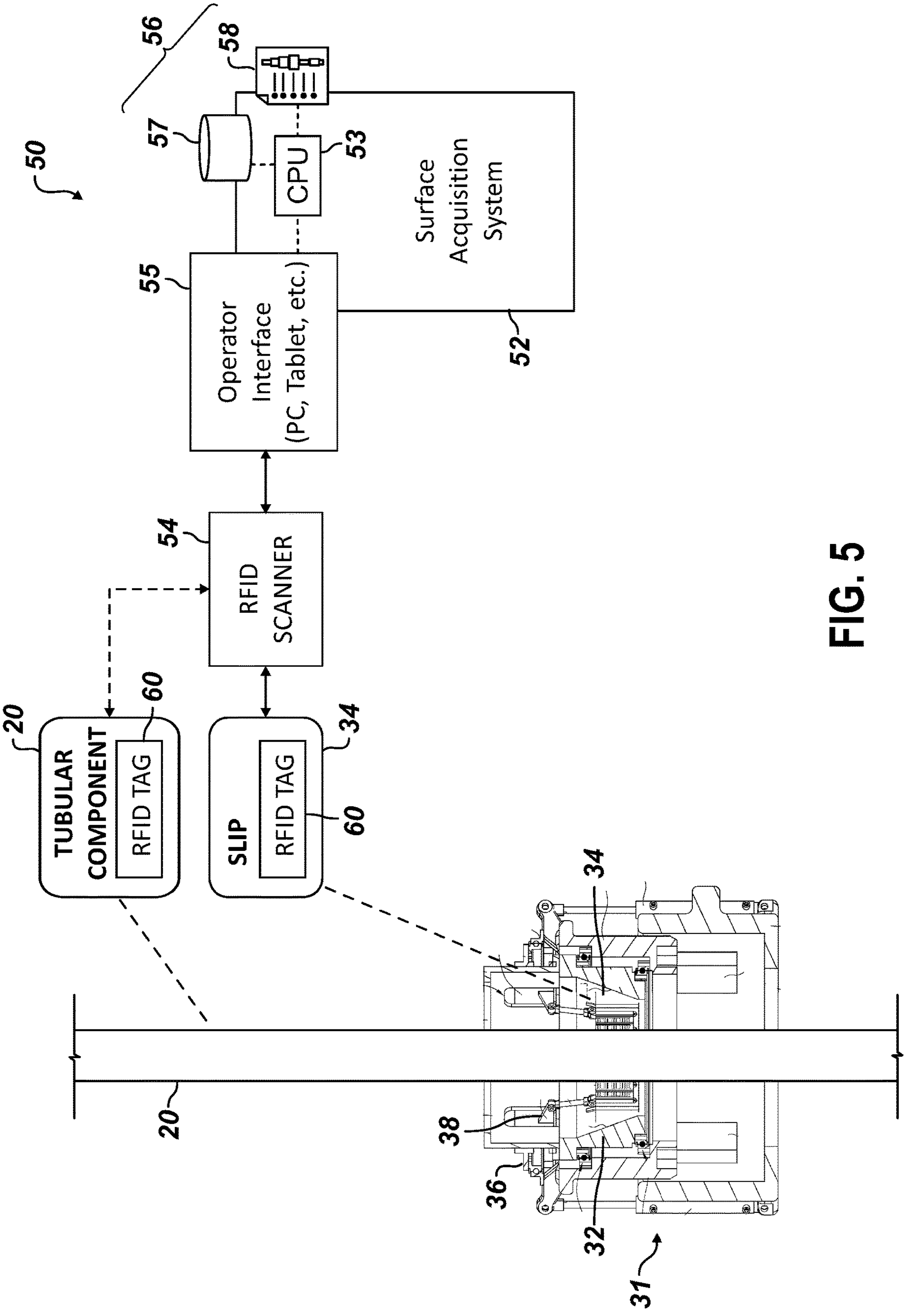
FIG. 5 illustrates the configuration system of the present disclosure used with a spider or an elevator of the tubular handling equipment.

FIG. 5 illustrates the configuration system 50 of the present disclosure used with handling equipment 31 (e.g., spider or elevator) of a tubular handling system. The configuration system 50 is used for tubular components 20 (e.g., pipe, tubulars, casing, etc.) handled at a wellsite using the handling equipment 31.

As again shown, the configuration system 50 of the present disclosure includes the data acquisition system 52 having a processing unit 53 and databases 56 storing sizing information 57 and wellsite plan 58. A scanner 54 can operate (connect, communicate, etc.) with the data acquisition system 52 to scan the machine-readable indicia 60 associated with the gripping elements 34 of the handling equipment 31. The scanner 54 may also operate to scan any machine-readable indicia 60 associated with tubular components 20.

The wellsite plan 58 stores a model of an installation planned and prepared for the wellsite. For example, the tubular dimensions of the tubular components 20 to be run in the well and their position in the installation may be stored in the wellsite plan 58. The sizing information 57 can include sizing parameters for a plurality of sized members, such as gripping elements 34 (e.g., slips) used in the handling equipment 31, such as a spider. The sizing parameter for a respective one of the gripping elements 34 define how the respective gripping element 34 is sized to engage one or more tubular dimensions.

As shown, the machine-readable indicia 60 are encoded with the sizing parameters for the gripping elements 34, and the encoded machine-readable indicia 60 are physically associated with the gripping elements 34. The tubular components 20 may also have machine-readable indicia 60. In either case, the tubular dimensions for the tubular components 20 handled at the wellsite are stored in the wellsite plan 58. For example, different sized tubulars, pipes, casings, and the like for the tubular components 20 may be planned for the installation to be deployed in the well. Also, assorted sizes of downhole tools, mandrels, and other equipment for the tubular components 20 may be planned for the installation to be deployed in the well.

When operations at the wellsite start, operators handle a current one of the tubular components 20 at the wellsite. For example, operators may be running a tubing string downhole from a rig and may be consecutively selecting and handling the tubular components 20 to be installed on the tubing string and deployed in the well. In another example, operators may be running a tubing string out of hole from a rig and may be consecutively selecting and handling the tubular components 20 being retrieved from the tubing string pulled from the well.

When handling each current tubular component 20, the sizing parameters associated with current ones of the gripping elements 34 installed in the tubular handling equipment 31 at the wellsite are determined by reading the encoded machine-readable indicia 60 of current gripping elements 34. This can be performed on the rig floor using an appropriate scanner 54. The sizing parameters of the currently installed gripping elements 34 are compared to the stored tubular dimension for the current tubular component 20 being handled at the wellsite.

For example, the scanner 54 of the configuration system 50 can be used to read the machine-readable indicia 60, such as RFID tag, associated with the gripping elements 34, and the configuration system 50 can determine the dimensional information of the currently installed gripping elements 34. By decoding the machine-readable indicia 60, the configuration system 50 can determine the part number for the current gripping elements 34. By extension, the configuration system 50 can then determine the associated operating range of tubular dimensions for which the current gripping elements 34 are configured and can compare the associated operating range with the dimension for the currently handled tubular component 20, stored in the wellsite plan 58 and/or read/determined from the tubular's machine-readable indicia 60.

Alternatively, by decoding the machine-readable indicia 60 of the current gripping elements 34, the configuration system 50 can directly determine the associated operating range of tubular dimensions for which the current gripping elements 34 are configured and can compare the associated operating range with the dimension for the currently handled tubular component 20, stored in the wellsite plan 58 and/or read/determined directly from the tubular's machine-readable indicia 60.

The configuration system 50 can then validate the setup for current tubing sizes to be run in the installation during operations, and the configuration system 50 can warn the operator when there is an error or when there is a need to switch the gripping elements 34 being used. In fact, the configuration system 50 can automatically adjust or reposition the gripping elements 34 in the handling equipment 31 (spider or elevator) to accommodate the current tubular size.

When performing the operations, for example, an incorrectly sized gripping element 34 may be currently configured on the handling equipment 31 and may not match the dimensional requirements for the tubular component 20 being handled. Accordingly, an automated response is then produced based on the comparison. This automated response can be a warning message given to operators on an operator interface 55. The warning message can indicate that an incorrectly sized gripping element 34 is currently configured on the handling equipment 31 and does not match the dimensional requirements for the tubular component 20 being handled.

Additionally or alternatively, the automated response can be an automated operation. For example, the tubular handling equipment 31 on the rig floor can change the position, orientation, spatial dimension, or the like of the current gripping element 34 so that it correctly matches the dimensional requirements for the tubular component 20 being handled. To do this, configuration system 50 can operate the linear actuator 38 (e.g., hydraulic piston) to move the support 36 to which the gripping elements 34 are attached. This can change the dimensions for the gripping elements 34 to grip the current tubular component 20.

As discussed above, the configuration system 50 can set up rig floor operations based on information read on the machine-readable indicia 60, e.g., RFID tags, of a tool or a tubular. Automation of the functions will reduce lost time due to incorrect setup and human error. Further details are provided below.

Figure 6:
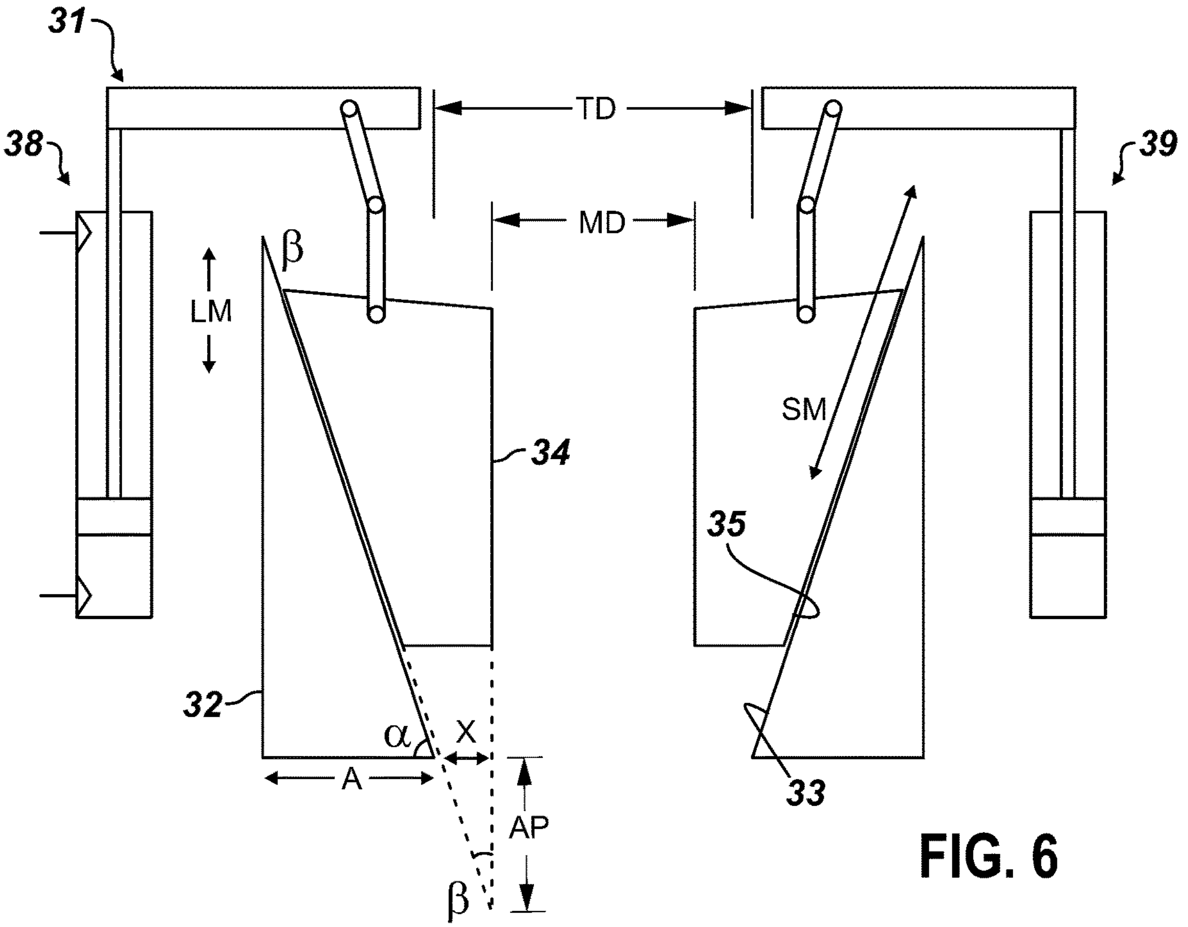
FIG. 6 illustrates a schematic arrangement of components in the spider or the elevator of the tubular handling equipment.

FIG. 6 illustrates a schematic arrangement of components in the tubular handling equipment 31. Gripping elements 34 are shown installed inside a bowl 32 having an inclined inner wall 33. The bowl 32 defines an angular orientation (a) for the inclined inner wall 33 and defines a total diameter (TD) that can be accommodated in the bowl 32. The gripping elements 34 have a lateral width (X) and have an inclined surface 35 that can be positioned along the inclined inner wall 33. An inner measured diameter (MD) is determined in the tubular handling equipment 31 based on the axial position (AP) of the gripping elements 34 relative to the bowl 32.

The tubular handling equipment 31 with this geometry can be used in one configuration to change the position of the gripping elements 34 in the bowl 32 to accommodate a defined size of tubular component (not shown) to be installed through the bowl 32 and engaged by the gripping elements 34. For example, the tubular handling equipment 31 can include a linear actuator 38, such as a hydraulic piston, linked to or coupled to the gripping elements 34, which can each include a slip portion and a carrier. Linear movement (LM) of the linear actuator 38 can shift the position of the gripping elements 34 along the inclined inner wall 33 by moving the gripping element 34 in the slip movement (SM) direction. The position of the gripping elements 34 changes the inner diameter (MD) to which the tubular handling equipment 31 and gripping elements 34 are configured to engage.

The measured diameter (MD) can be calculated and set by the linear movement (LM) of the linear actuator 38 changing the axial position (AP) of the gripping elements 34. For example, the measured diameter (MP) can be defined by the total diameter (TD) minus twice an added width (X) from the gripping elements 34. Namely, $MD=TD-2X$, where $X=AP*\tan\beta$ and AP is related to the linear movement (LM) of the linear actuator 38.

In another configuration, the tubular handling equipment 31 with this geometry can be used to measure the size of a tubular component (not shown) installed in the bowl 32 and engaged by the gripping elements 34. For example, the tubular handling equipment 31 can include a linear transducer 39 linked to or coupled to the gripping elements 34. The linear position measured by the linear transducer 39 with the gripping elements 34 engaged with the tubular component (not shown) in the bowl 32 can provide the measured diameter (MD) for comparison against operator settings, can determine that the gripping elements 34 are open or closed, can determining if there is tubular component 20 present or not in the bowl 32. It is also possible to compare the well service design against the tubular component 20 being used on the rig floor.

Figure 7:
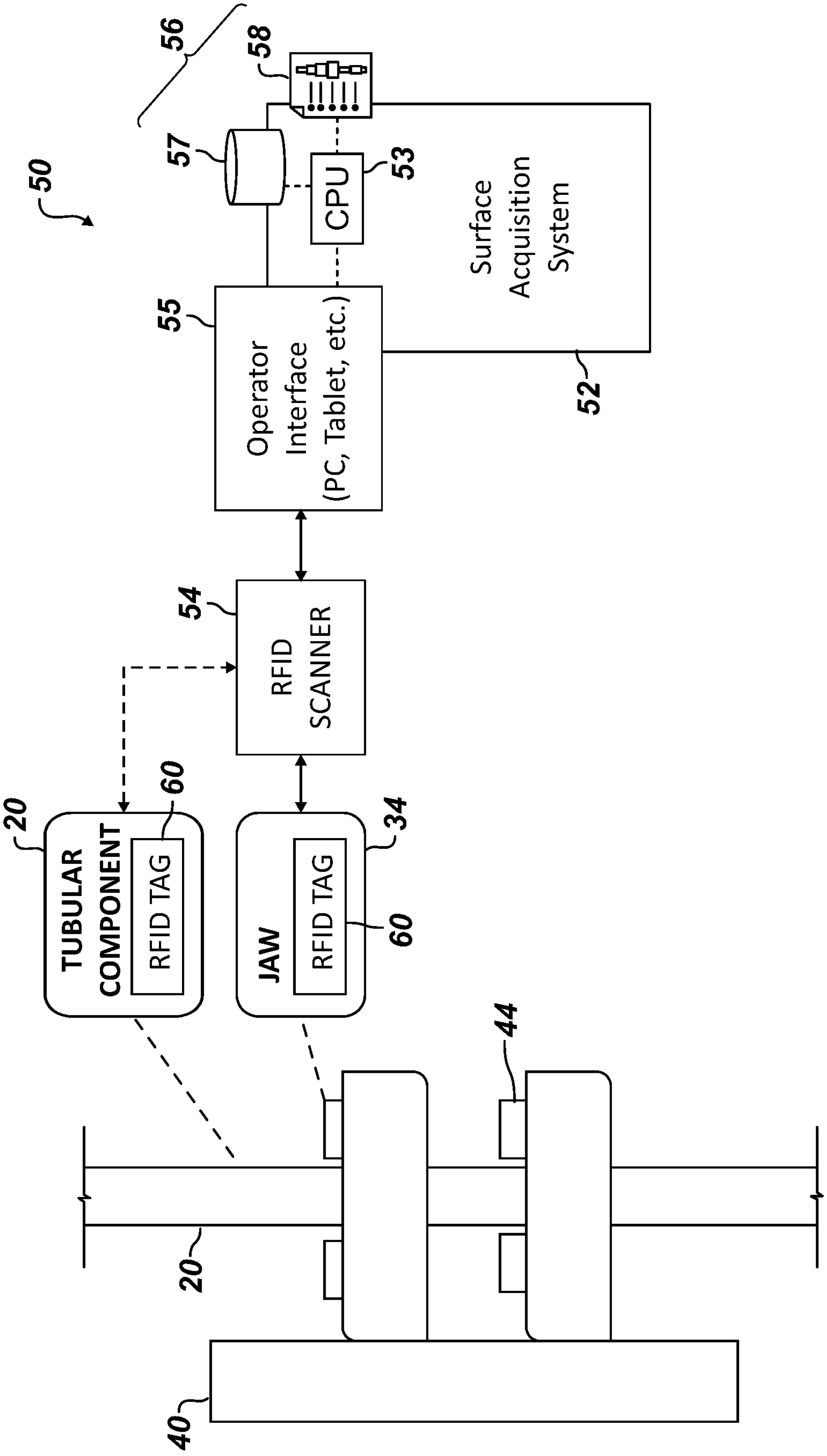
FIG. 7 illustrates the configuration system of the present disclosure used with a power tong of the tubular handling system.

FIG. 7 illustrates the configuration system 50 of the present disclosure used with another type of handling equipment (e.g., a power tong 40) of the tubular handling system. The configuration system 50 is used for tubular components 20 (e.g., pipe, tubulars, casing, etc.) handled by the tong 40 at a wellsite. The power tong 40 has jaws 44 and is used to make up or break out pipe connections of the tubular components 20.

Depending on the installation and the well plan, the dimensions of the tubular components 20 being run downhole can differ from one another. The tubular dimensions may fall inside or outside the dimensional range of the tong's currently installed jaws 44. In many cases, the power tong 40 with current jaws 44 can handle multiple pipe sizes depending on the size of the jaws 44 installed. At times during operations, however, the current jaws 44 for the power tong 40 may need to be changed to meet the proper tubular size being currently handled.

As again shown, the configuration system 50 of the present disclosure includes the data acquisition system 52 having a processing unit 53 and databases 56 storing sizing information 57 and wellsite plan 58. A scanner 54 can operate (connect, communicate, etc.) with the data acquisition system 52 to scan the machine-readable indicia 60 associated with the power tong 40. The scanner 54 may also operate to scan the machine-readable indicia 60 associated with tubular components 20.

The wellsite plan 58 stores the installation the planned and prepared for the wellsite. For example, the tubular dimensions of the tubular components 20 to be run in the well and their position in the installation may be stored in the wellsite plan 58. The sizing information 57 can include sizing parameters for a plurality of sized members, such as the jaws 44 used in the power tong 40. The sizing parameter for a respective one of the jaws 44 define how the respective jaw 44 is sized to engage one or more tubular dimensions.

As shown, the machine-readable indicia 60 are encoded with the sizing parameters for the jaws 44, and the encoded machine-readable indicia 60 are physically associated with the jaws 44. The tubular components 20 may also have machine-readable indicia 60. In either case, the tubular dimensions for the tubular components 20 handled at the wellsite are stored in the wellsite plan 58. For example, different sized tubulars, pipes, casings, and the like for the tubular components 20 may be planned for the installation to be deployed in the well. Also, assorted sizes of downhole tools, mandrels, and other equipment for the tubular components 20 may be planned for the installation to be deployed in the well.

When operations at the wellsite start, operators handle a current one of the tubular components 20 at the wellsite. For example, operators may be running a tubing string downhole from a rig and may be consecutively selecting and handling the tubular components 20 to be installed on the tubing string and deployed in the well. In another example, operators may be running a tubing string out of hole from a rig and may be consecutively selecting and handling the tubular components 20 being retrieved from the tubing string pulled from the well.

When handling each current tubular component 20, the sizing parameters associated with the current jaws 44 installed in the power tong 40 at the wellsite are determined by reading the encoded machine-readable indicia 60 of current gripping elements 34 (e.g., jaws). This can be performed on the rig floor using an appropriate scanner 54. The sizing parameters of the currently installed jaws 44 are compared to the stored tubular dimension for the current tubular component 20 being handled at the wellsite.

For example, the scanner 54 of the configuration system 50 can be used to read the machine-readable indicia 60, such as an RFID tag, associated with the jaws 44, and the configuration system 50 can determine the dimensional information of the currently installed jaws 44. By decoding the machine-readable indicia 60, the configuration system 50 can determine the part number for the current jaws 44. By extension, the configuration system 50 can then determine the associated operating range of pipe dimensions for which the current jaws 44 are configured and can compare the associated operating range with the dimension for the currently handled tubular component 20, stored in the wellsite plan 58 and/or read/determined from the tubular's machine-readable indicia 60. Alternatively, by decoding the machine-readable indicia 60 of the jaws 44, the configuration system 50 can directly determine the associated operating range of tubular dimensions for which the current jaws 44 are configured and can compare the associated operating range with the dimension for the currently handled tubular component 20, stored in the wellsite plan 58 and/or read/determined from the tubular's machine-readable indicia 60. The configuration system 50 can then validate the setup for current tubing sizes to be run in the installation during operations, and the configuration system 50 can warn the operator when there is an error or when there is a need to switch the jaws 44 being used.

When performing the operations, for example, incorrectly sized jaws 44 may be currently configured on the power tong 40 and may not match the dimensional requirements for the tubular component 20 being handled. Accordingly, an automated response is then produced based on the comparison. This automated response can be a warning message given to operators on an operator interface 55. The warning message can indicate that incorrectly sized jaws 44 is currently configured on the rig and does not match the dimensional requirements for the tubular component 20 being handled.

Additionally or alternatively, the automated response can be an automated operation. For example, the power tong 40 on the rig floor can change the position, orientation, spatial dimension, or the like of the current jaws 44 so that it correctly matches the dimensional requirements for the tubular component 20 being handled.

Figure 8:
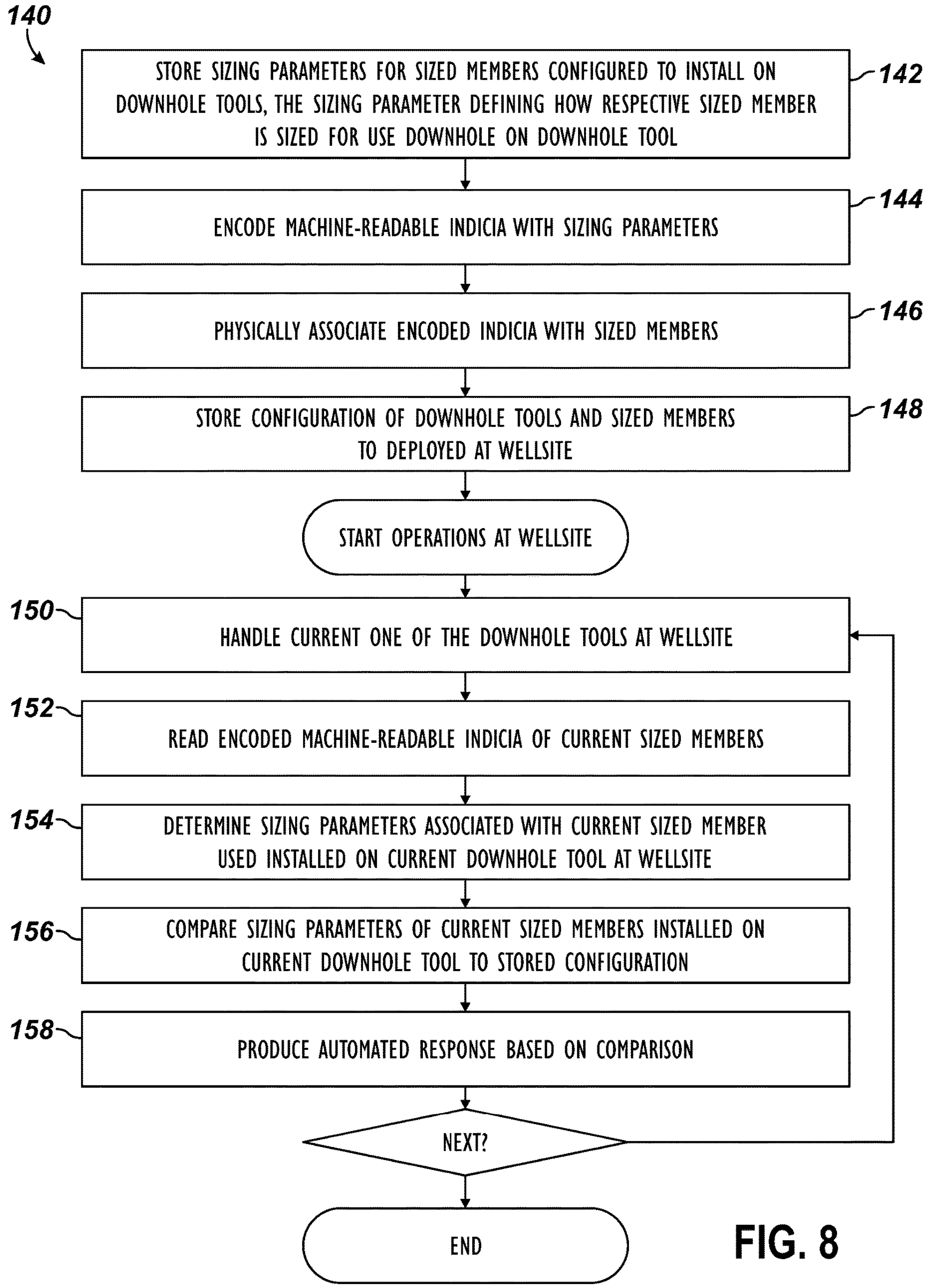
FIG. 8 illustrates another configuration of the process used with downhole tools deployed at a wellsite.

As noted above, the configuration system 50 and methods can be used with downhole tools to be deployed in a well. For example, FIG. 8 illustrates another configuration of a process 140 implemented in a computerized configuration system 50 for use with downhole tools deployed at a wellsite.

Either at the wellsite or elsewhere, operators plan and prepare an installation for the wellsite and select and prepare the equipment to be used at the wellsite for a job. Operators configure sizing information 57 in the databases 56 for sized members (e.g., arms, calipers, fingers, linkages, springs, pads, gripping elements, slips, carriers, dressing accessories, etc.) to be used with the downhole tools, and operators configure the wellsite plans 58 of the downhole components (i.e., tubular components 20, tools, etc.) to be used at the wellsite.

In particular, sizing parameters for sized members configured to install on the downhole tools are stored in one or more databases 56 of the computerized configuration system 50. The sizing parameter for a respective one of the sized members defines how the respective sized members is sized for use downhole on the downhole tool (Block 142).

Once the sizing parameters are stored, machine-readable indicia 60 are encoded with the sizing parameters for the sized members (Block 144), and the encoded machine-readable indicia 60 are physically associated with the sized members (Block 146).

In the plans and preparations for the installation at the wellsite stored in the wellsite plan 58, a configuration of the downhole tools and the sized members to deployed at the wellsite are stored in the one or more databases 56 (Block 148). For example, the configuration may call for different downhole tools to have particular sized members to be run on at different points on the tubing string as it is being deployed.

When operations at the wellsite start, operators handle a current one of the downhole tools at the wellsite (Block 150). For example, operators may be running a tubing string downhole from a rig and may be consecutively selecting and handling the downhole tools to be installed on the tubing string and deployed in the well.

When handling each current downhole tool, the sizing parameter associated with current one of the sized members installed on the current downhole tool at the wellsite are determined by reading the encoded machine-readable indicia 60 of the current sized members (Block 152, 154). This can be performed on the rig floor using an appropriate scanner 54. The sizing parameter of the current sized members installed on the current downhole tool at the wellsite are compared to the stored configuration in the wellsite plan 58 of the downhole tools and the sized members to be deployed at the wellsite (Block 156).

When performing the operations, for example, an incorrectly sized member may be currently configured on the current downhole tool on the rig and may not match the dimensional requirements for the downhole tool to be deployed at this point in the tubing string being run downhole. Accordingly, an automated response is then produced based on the comparison (Block 158).

For example, comparing the sizing parameters to the stored tubular dimension can verify whether the sizing parameters of the current sized members fail to fit the stored tubular dimension for the current downhole tool. Producing the automated response based on the comparison can thereby involve producing a warning in response to the verification. This automated response can be a warning message given to operators. The warning message can indicate that an incorrectly sized member is currently installed on the downhole tool and does not match the dimensional requirements for the downhole tool to be deployed. In response to the warning, operators can change the sized member installed on the downhole tool so that it correctly matches the dimensional requirements for the planned configuration.

Additionally or alternatively, the automated response can be an automated operation. For instance, a piece of equipment on the downhole tool can change or adjust the position, orientation, spatial dimension, or the like of the current sized member so that it correctly matches the dimensional requirements for the downhole tool being handled and deployed.

Figure 9:
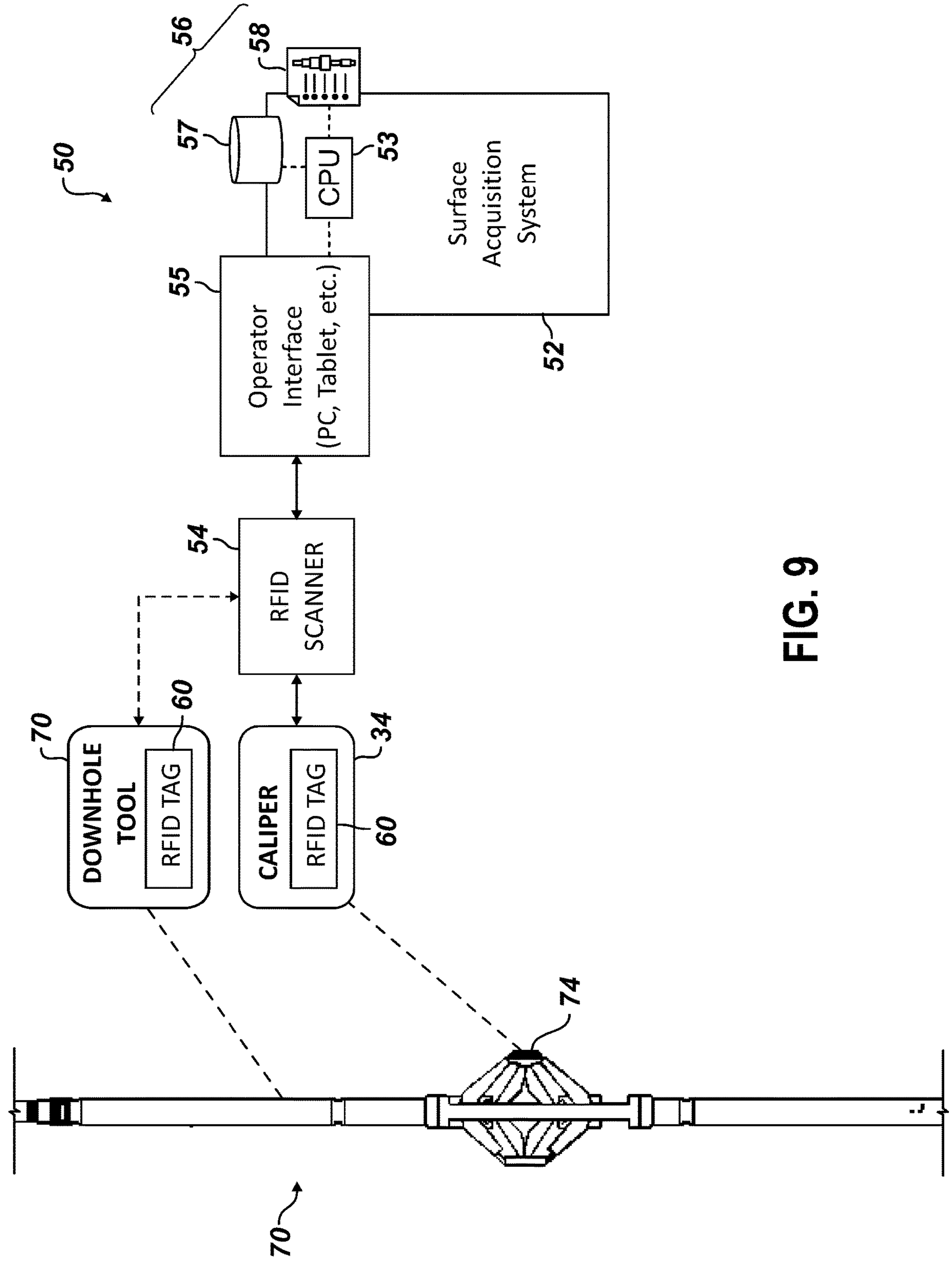
FIG. 9 illustrates the configuration system of the present disclosure used with an example downhole tool.

FIG. 9 illustrates the configuration system 50 of the present disclosure used with a downhole tool 70. In this example, the downhole tool 70 is a caliper tool run on a tubing string in a well. The caliper tool 70 has a sized member 74, such as a caliper sized and used to make measurements downhole. For example, the caliper 74 includes mechanical components, such as arms, fingers, linkages, springs, pads, gripping elements, slips, carriers, dressing accessories, etc. to engage inside downhole diameters, and the caliper 74 includes instrumentation to measure dimensions from the engagement of the mechanical components with the surrounding downhole walls. The caliper tool 70 can also include orientation sensors and the like to log the depth and path of the downhole measurements in association with the dimensions measured downhole.

As again shown, the configuration system 50 of the present disclosure includes the data acquisition system 52 having a processing unit 53 and databases 56 storing sizing information 57 and wellsite plans 58. A scanner 54 can operate (connect, communicate, etc.) with the data acquisition system 52 to scan the machine-readable indicium 60 associated with the caliper tool 70. The scanner 54 may also operate to scan the machine-readable indicia 60 associated with the calipers 74.

The wellsite plan 58 stores the installation the planned and prepared for the wellsite. For example, the dimensions to be measured by the caliper tool 70 in the well and their position in the installation in the well may be stored in the wellsite plan 58. The sizing information 57 can include sizing parameters for a plurality of sized members, such as the caliper 74 used in the caliper tool 70. The sizing parameter for a respective one of the caliper 74 define how the respective caliper 74 is sized to engage one or more dimensions downhole in the wells.

As shown, the machine-readable indicia 60 are encoded with the sizing parameters for the calipers 74, and the encoded machine-readable indicia 60 are physically associated with the calipers 74. The caliper tool 70 may also have machine-readable indicia 60. In either case, the dimensions for the installation are stored in the wellsite plan 58. For example, the caliper tool 70 may be configured to measure particular tubulars, pipes, casings, and the like for tubular components installed in the well. Also, the caliper tool 70 may be configured to measure particular open hole dimensions drilled in the well according to the planned installation.

When operations at the wellsite start, operators handle a current caliper tool 70, which may be configured to measure particular dimensions in the well. For example, operators may be running a tubing string downhole from a rig and may be selecting and handling the caliper tool 70 to measure in the well.

When handling the current caliper tool 70, the sizing parameters associated with the caliper 74 installed in the caliper tool 70 at the wellsite are determined by reading the encoded machine-readable indicium 60 of the current caliper 74. This can be performed on the rig floor using an appropriate scanner 54. The sizing parameters of the currently installed caliper 74 are compared to the stored dimension planned for the installation.

For example, the scanner 54 of the configuration system 50 can be used to read the machine-readable indicia 60, such as RFID tag, associated with the calipers 74, and the configuration system 50 can determine the dimensional information of the currently installed calipers 74. By decoding the machine-readable indicia 60, the configuration system 50 can determine the part number for the current calipers 74. By extension, the configuration system 50 can then determine the associated operating range of pipe dimensions for which the current calipers 74 are configured and can compare the associated operating range with the dimension stored in the wellsite plan 58. Alternatively, by decoding the machine-readable indicia 60 of the calipers 74, the configuration system 50 can directly determine the associated operating range of tubular dimensions for which the current calipers 74 are configured and can compare the associated operating range with the dimensions stored in the wellsite plan 58.

The configuration system 50 can then validate the setup of the caliper tool 70 to be run in the installation during operations, and the configuration system 50 can warn the operator when there is an error or when there is a need to switch the calipers 74 being used. For example, the calipers 74 may need to be changed depending on hole size. Improper setup can cause caliper failure, poor engagement, or caliper damage.

When performing the operations, for example, an incorrectly sized caliper 74 may be currently configured on the caliper tool 70 and may not match the dimensional requirements to be run downhole. Accordingly, an automated response can then be produced based on the comparison. This automated response can be a warning message given to operators on an operator interface 55. The warning message can indicate that an incorrectly sized caliper 74 is currently configured on the caliper tool 70 and does not match the dimensional requirements for the installation.

Additionally or alternatively, the automated response can be an automated operation. For example, the caliper tool 70 can be adjusted to change the position, orientation, spatial dimension, or the like of the current caliper 74 so that it correctly matches the dimensional requirements for the installation.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

The invention claimed is:

1. A method implemented in a computerized system for tubular components handled by handling equipment at a wellsite, the method comprising:

- storing, in one or more databases of the computerized system, respective sizing parameters for gripping elements used by the handling equipment, the respective sizing parameter for each respective one of the gripping elements defining how the respective gripping element is sized to engage one or more tubular dimensions;
- encoding, with the computerized system, machine-readable indicia with the respective sizing parameters for the gripping elements;
- physically associating the machine-readable indicia with the gripping elements;
- storing, as stored tubular dimensions in the one or more databases, the one or more tubular dimensions for the tubular components to be handled at the wellsite; and
- handling a current one of the tubular components at the wellsite with the handling equipment, the handling equipment using a current one of the gripping elements, the current gripping element having a machine-readable indicium of the machine-readable indicia, by performing the steps of:
  - determining the respective sizing parameter associated with the current gripping element by reading, with the computerized system, the machine-readable indicium of the current gripping element;
  - comparing, in a comparison with the computerized system, the respective sizing parameter of the current gripping element to the stored tubular dimension stored for the current tubular component; and
  - producing, with the computerized system, an automated response based on the comparison.

2. The method of claim 1, wherein storing the respective sizing parameters for the gripping elements comprises associating identifiers with the respective sizing parameters; wherein encoding the machine-readable indicia with the respective sizing parameters for the gripping elements comprises encoding the machine-readable indicia with the associated identifiers; and wherein determining the respective sizing parameter associated with the current gripping element comprises decoding the identifier from the machine-readable indicium read from the current gripping element; accessing the respective sizing parameter associated in the one or more databases with the decoded identifier; and using the accessed sizing parameter in the comparison to the tubular dimension stored for the current tubular component being handled at the wellsite.

3. The method of claim 1, wherein storing the respective sizing parameters for the gripping elements comprises associating direct sizes with the respective sizing parameters; wherein encoding the machine-readable indicia with the respective sizing parameters for the gripping elements comprises encoding the machine-readable indicia with the associated direct sizes; and wherein determining the respective sizing parameter associated with the current gripping element comprises decoding the direct size from the machine-readable indicium read from the current gripping element; and directly using the decoded size in the comparison to the tubular dimension stored for the current tubular component being handled at the wellsite.

4. The method of claim 1, wherein encoding, with the computerized system, the machine-readable indicia with the respective sizing parameters for the gripping elements comprises encoding at least one of scannable codes, quick response (QR) codes, bar codes, two-dimensional matrix codes, and radio frequency identification (RFID) devices with the respective sizing parameters.

5. The method of claim 1, wherein physically associating the machine-readable indicia with the gripping elements comprises affixing at least one of scannable codes, quick response (QR) codes, bar codes, two-dimensional matrix codes, and radio frequency identification (RFID) devices on the gripping elements.

6. The method of claim 1, wherein storing, in the one or more databases, the tubular dimensions for the tubular components handled at the wellsite comprises storing a plan of the tubular components to be installed in a well at the wellsite.

7. The method of claim 1, wherein reading the machine-readable indicium of the current gripping element comprises reading the machine-readable indicium with a scanner at the wellsite.

8. The method of claim 7, wherein the scanner is selected from the group consisting of an optical reader, a camera, an RFID reader, and an RFID reader/writer.

9. The method of claim 1, wherein comparing the respective sizing parameter of the current gripping element to the stored tubular dimension for the current tubular component comprises verifying that the respective sizing parameter of the current gripping element fails to fit the stored tubular dimension for the current tubular component.

10. The method of claim 9, wherein producing the automated response based on the comparison comprises producing a warning in response to the verification.

11. The method of claim 9, wherein producing the automated response based on the comparison comprises automatically adjusting position of the current gripping elements in the handling equipment to fit the tubular dimension stored for the current tubular component being handled at the wellsite.

12. A method implemented in a computerized system for downhole tools deployed at a wellsite, the method comprising:

storing, in one or more databases of the computerized system, respective sizing parameters for sized members used by the downhole tools, the respective sizing parameter for each respective one of the sized members defining how the respective sized member is sized for use downhole on the downhole tool;

encoding, with the computerized system, machine-readable indicia with the respective sizing parameters for the sized members;

physically associating the machine-readable indicia with the sized members;

storing, as a stored configuration in the one or more databases, a configuration of the downhole tools and the sized members to be deployed at the wellsite; and handling a current one of the downhole tools at the wellsite having a current one of the sized members, the current sized member having a machine-readable indicium of the machine-readable indicia, by performing the steps of:

determining the respective sizing parameter associated with the current sized member by reading, with the computerized system, the machine-readable indicium of current sized member;

comparing, in a comparison with the computerized system, the respective sizing parameter of the current sized member to the stored configuration of the downhole tools and the sized members to be deployed at the wellsite; and producing, with the computerized system, an automated response based on the comparison.

13. The method of claim 12, wherein the sized members used by the downhole tools are selected from the group consisting of arms, calipers, fingers, linkages, springs, pads, gripping elements, slips, jaws, carriers, and dressing accessories.

14. The method of claim 12, wherein comparing the respective sizing parameter of the current sized member to the stored configuration of the downhole tools and the sized members to be deployed at the wellsite comprises verifying that the respective sizing parameter of the current sized member fails to match the stored configuration.

15. The method of claim 14, wherein producing the automated response based on the comparison comprises producing a warning in response to the verification.

16. The method of claim 14, wherein producing the automated response based on the comparison comprises automatically adjusting position of the current sized member on the downhole tool to match the stored configuration.

17. A method implemented in a computerized system for downhole components used at a wellsite, the method comprising:

storing, in one or more databases of the computerized system, respective sizing parameters for sized members associated with the downhole components, the respective sizing parameter for each respective one of the sized members defining how the respective sized member is sized for the downhole components;

encoding, with the computerized system, machine-readable indicia with the respective sizing parameters for the sized members;

physically associating the machine-readable indicia with the sized members;

storing, as stored dimension in the one or more databases, dimensions of the downhole components used at the wellsite; and handling a current one of the downhole components at the wellsite, the current downhole component associated with a current one of the sized members, the current sized member having a machine-readable indicium of the machine-readable indicia, by performing the steps of:

determining the respective sizing parameters associated with the current sized member associated with the current downhole component by reading, with the computerized system, the machine-readable indicium of current sized member;

comparing, in a comparison with the computerized system, the respective sizing parameters of the current sized member to the stored dimensions of the downhole components used at the wellsite; and producing, with the computerized system, an automated response based on the comparison.

18. The method of claim 17, in which the downhole components are tubular components and the sized members are gripping elements used with handling equipment, wherein the respective sizing parameters for each respective one of the gripping elements defines how the respective gripping element is sized to engage one or more tubular dimensions as the dimensions of the downhole components used at the wellsite; and wherein handling a current one of the tubular components at the wellsite comprises performing the steps of:

determining the respective sizing parameters associated with the current gripping element by reading, with the computerized system, the machine-readable indicium of the current gripping element;

comparing, in a comparison with the computerized system, the respective sizing parameter of the current gripping element to a stored tubular dimension for the stored dimensions of the current tubular component; and producing, with the computerized system, the automated response based on the comparison.

19. The method of claim 17, in which the downhole components are downhole tools deployed at the wellsite and the sized members are used by the downhole tools, wherein the respective sizing parameter is for a respective one of the sized members defining how the respective sized member is sized for use downhole on the downhole tool; and wherein handling a current one of the downhole tools at the wellsite comprises performing the steps of:

determining the respective sizing parameter associated with the current sized member by reading, with the computerized system, the machine-readable indicium of the current sized member;

comparing, in a comparison with the computerized system, the respective sizing parameter of the current sized member to a stored configuration for the stored dimensions of the downhole tools and the sized members to deployed at the wellsite; and producing, with the computerized system, the automated response based on the comparison.

20. A computerized system for downhole components used at a wellsite, the system comprising:

a database component storing respective sizing parameters for sized members used with the downhole components, the respective sizing parameter for each respective one of the sized members defining how the respective sized member is sized for use with the downhole components, the database component storing dimensions of the downhole components to be used at the wellsite;

machine-readable indicia encoding the respective sizing parameters for the sized members, the machine-readable indicia physically associated with the sized members; and one or more processing units in operable communication with the database component and being configured to:

read the machine-readable indicia of current sized members;

determine the respective sizing parameters associated with the current sized members used with a current one of downhole components at the wellsite;

compare, in a comparison, the respective sizing parameters of the current sized members to the stored dimensions of the downhole components used at the wellsite; and produce an automated response based on the comparison.

* * * * *